(12) United States Patent
Spaur et al.

(10) Patent No.: US 7,975,110 B1
(45) Date of Patent: Jul. 5, 2011

(54) METHOD AND SYSTEM FOR SUPPORTING MULTIPLE EXTERNAL SERIAL PORT DEVICES USING A SERIAL PORT CONTROLLER IN EMBEDDED DISK CONTROLLERS

(75) Inventors: Michael R. Spaur, Dana Point, CA (US); Ihn Kim, Laguna Niguel, CA (US)

(73) Assignee: Marvell International Ltd., Hamilton (BM)

( * ) Notice: Subject to any disclaimer, the term of this patent is extended or adjusted under 35 U.S.C. 154(b) by 270 days.

(21) Appl. No.: 11/384,657

(22) Filed: Mar. 20, 2006

Related U.S. Application Data (63) Continuation of application No. 10/385,039, filed on Mar. 10, 2003, now Pat. No. 7,039,771.

(51) Int. Cl.
*G06F 12/00* (2006.01)
*G06F 13/00* (2006.01)

(52) U.S. Cl. ......... 711/152; 711/112; 711/113; 711/154

(58) Field of Classification Search .................. 711/100, 711/112, 113, 147, 148, 149, 150, 151, 152, 711/153

See application file for complete search history.

(56) References Cited

U.S. PATENT DOCUMENTS

| | | | |
|---|---|---|---|
| 3,800,281 A | 3/1974 | Devore et al. | |
| 3,988,716 A | 10/1976 | Fletcher et al. | |
| 4,001,883 A | 1/1977 | Strout et al. | |
| 4,016,368 A | 4/1977 | Apple, Jr. | |
| 4,050,097 A | 9/1977 | Miu et al. | |
| 4,080,649 A | 3/1978 | Calle et al. | |
| 4,144,583 A * | 3/1979 | Lawson et al. | 711/112 |
| 4,156,867 A | 5/1979 | Bench et al. | |
| 4,225,960 A | 9/1980 | Masters | |
| 4,275,457 A | 6/1981 | Leighou et al. | |
| 4,390,969 A | 6/1983 | Hayes | |
| 4,451,898 A | 5/1984 | Palermo et al. | |
| 4,486,750 A | 12/1984 | Aoki | |
| 4,486,827 A | 12/1984 | Shima et al. | |
| 4,500,926 A | 2/1985 | Yoshimaru et al. | |
| 4,587,609 A | 5/1986 | Boudreau et al. | |
| 4,603,382 A | 7/1986 | Cole et al. | |
| 4,625,321 A | 11/1986 | Pechar et al. | |
| 4,667,286 A | 5/1987 | Young et al. | |
| 4,777,635 A | 10/1988 | Glover | |
| 4,805,046 A | 2/1989 | Kuroki et al. | |
| 4,807,116 A | 2/1989 | Katzman et al. | |

(Continued)

FOREIGN PATENT DOCUMENTS

EP 0528273 2/1993

(Continued)

OTHER PUBLICATIONS

PCT International Search Report, Doc. No. PCT/US00/15084, Dated Nov. 15, 2000, 2 Pages.

(Continued)

*Primary Examiner* — Tuan V. Thai (57) ABSTRACT

A servo controller for a disk drive controller comprising a storage device that stores communication information for a plurality of devices and a serial port controller located on the servo controller that communicates with the storage device, that receives a request to communicate with one of the plurality of devices, and that allows communication between at least one processor and the one of the plurality of devices according to the stored communication information and the request, wherein each of the plurality of devices uses a different protocol.

26 Claims, 6 Drawing Sheets

U.S. PATENT DOCUMENTS

| | | | |
|---|---|---|---|
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,179,704 A | 1/1993 | Jibbe et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson et al. |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,317,713 A * | 5/1994 | Glassburn ............... 711/113 |
| 5,329,630 A | 7/1994 | Baldwin |
| 5,339,443 A | 8/1994 | Lockwood |
| 5,349,667 A | 9/1994 | Kaneko |
| 5,361,266 A | 11/1994 | Kodama et al. |
| 5,361,267 A | 11/1994 | Godiwala et al. |
| 5,375,248 A | 12/1994 | Lemay et al. |
| 5,408,644 A | 4/1995 | Schneider et al. |
| 5,408,673 A | 4/1995 | Childers et al. |
| 5,420,984 A | 5/1995 | Good et al. |
| 5,428,627 A | 6/1995 | Gupta |
| 5,440,751 A | 8/1995 | Santeler et al. |
| 5,465,343 A * | 11/1995 | Henson et al. ............ 711/112 |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini |
| 5,546,545 A | 8/1996 | Rich |
| 5,546,548 A | 8/1996 | Chen et al. |
| 5,557,764 A | 9/1996 | Stewart et al. |
| 5,563,896 A | 10/1996 | Nakaguchi |
| 5,568,606 A | 10/1996 | Dobbek |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,590,380 A | 12/1996 | Yamada et al. |
| 5,592,404 A | 1/1997 | Zook |
| 5,600,662 A | 2/1997 | Zook |
| 5,602,857 A | 2/1997 | Zook et al. |
| 5,603,035 A | 2/1997 | Erramoun et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,659,759 A | 8/1997 | Yamada |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,692,516 A | 12/1997 | Kaneko et al. |
| 5,719,516 A | 2/1998 | Sharpe-Geisler |
| 5,729,511 A | 3/1998 | Schell et al. |
| 5,729,718 A | 3/1998 | Au |
| 5,734,848 A | 3/1998 | Gates et al. |
| 5,740,466 A | 4/1998 | Geldman et al. |
| 5,745,793 A | 4/1998 | Atsatt et al. |
| 5,754,759 A | 5/1998 | Clarke et al. |
| 5,758,188 A | 5/1998 | Applebaum et al. |
| 5,768,044 A | 6/1998 | Hetzler et al. |
| 5,784,569 A | 7/1998 | Miller et al. |
| 5,787,483 A | 7/1998 | Jam et al. |
| 5,794,073 A | 8/1998 | Ramakrishnan et al. |
| 5,801,998 A | 9/1998 | Choi |
| 5,805,370 A | 9/1998 | Lee |
| 5,818,886 A | 10/1998 | Castle |
| 5,822,142 A | 10/1998 | Hicken |
| 5,826,093 A | 10/1998 | Assouad et al. |
| 5,831,922 A | 11/1998 | Choi |
| 5,835,299 A | 11/1998 | Lee et al. |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,928,367 A | 7/1999 | Nelson et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,021,458 A | 2/2000 | Jayakumar et al. |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,397 A | 6/2000 | Belser |
| 6,081,849 A | 6/2000 | Born et al. |
| 6,081,867 A | 6/2000 | Cox |
| 6,092,231 A | 7/2000 | Sze |
| 6,094,320 A | 7/2000 | Ahn |
| 6,105,119 A | 8/2000 | Kerr et al. |
| 6,108,150 A | 8/2000 | Lee |
| 6,115,778 A | 9/2000 | Miyake et al. |
| 6,124,994 A | 9/2000 | Malone, Sr. |
| 6,128,153 A | 10/2000 | Hasegawa et al. |
| 6,134,063 A | 10/2000 | Weston-Lewis et al. |
| 6,134,676 A | 10/2000 | VanHuben et al. |
| 6,157,984 A * | 12/2000 | Fisher et al. ............ 711/112 |

| | | |
|---|---|---|
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,285,632 B1 | 9/2001 | Ueki |
| 6,297,926 B1 | 10/2001 | Ahn |
| 6,314,480 B1 | 11/2001 | Nemazie et al. |
| 6,330,626 B1 | 12/2001 | Dennin et al. |
| 6,381,659 B2 | 4/2002 | Proch et al. |
| 6,401,149 B1 | 6/2002 | Dennin et al. |
| 6,401,154 B1 | 6/2002 | Chiu et al. |
| 6,421,760 B1 | 7/2002 | McDonald et al. |
| 6,470,461 B1 | 10/2002 | Pinvidic et al. |
| 6,487,631 B2 | 11/2002 | Dickinson et al. |
| 6,490,635 B1 | 12/2002 | Holmes |
| 6,493,171 B2 | 12/2002 | Enokida et al. |
| 6,496,517 B1 | 12/2002 | Gehman et al. |
| 6,515,813 B2 | 2/2003 | Kitazaki et al. |
| 6,530,000 B1 | 3/2003 | Krantz et al. |
| 6,574,676 B1 | 6/2003 | Megiddo |
| 6,574,699 B1 | 6/2003 | Dobbek |
| 6,583,943 B2 | 6/2003 | Malone |
| 6,594,721 B1 | 7/2003 | Sakarda et al. |
| 6,618,780 B1 | 9/2003 | Popat |
| 6,629,204 B2 | 9/2003 | Tanaka et al. |
| 6,651,126 B1 | 11/2003 | Cantrell et al. |
| 6,662,253 B1 | 12/2003 | Gary et al. |
| 6,662,313 B1 | 12/2003 | Swanson et al. |
| 6,662,334 B1 | 12/2003 | Stenfort |
| 6,693,462 B1 | 2/2004 | Wang et al. |
| 6,694,398 B1 | 2/2004 | Zhao et al. |
| 6,711,643 B2 | 3/2004 | Park et al. |
| 6,714,373 B1 | 3/2004 | Sasaki |
| 6,721,828 B2 | 4/2004 | Verinsky et al. |
| 6,728,054 B2 | 4/2004 | Chng et al. |
| 6,728,814 B2 | 4/2004 | Leinen |
| 6,742,060 B2 | 5/2004 | Poisner et al. |
| 6,742,065 B2 | 5/2004 | Suh |
| 6,765,736 B2 | 7/2004 | Ko et al. |
| 6,765,744 B2 | 7/2004 | Gomez et al. |
| 6,772,258 B2 | 8/2004 | Poisner et al. |
| 6,807,595 B2 | 10/2004 | Khan et al. |
| 6,826,650 B1 | 11/2004 | Krantz et al. |
| 6,842,819 B2 | 1/2005 | Smith et al. |
| 6,880,030 B2 | 4/2005 | Brenner et al. |
| 6,895,500 B1 | 5/2005 | Rothberg |
| 6,917,997 B2 | 7/2005 | Bhagat |
| 6,924,953 B2 * | 8/2005 | Fish et al. ............ 360/69 |
| 6,944,703 B2 | 9/2005 | Okaue et al. |
| 6,947,233 B2 | 9/2005 | Toda |
| 6,950,258 B2 | 9/2005 | Takaishi |
| 6,952,749 B2 | 10/2005 | Kim |
| 6,963,462 B2 | 11/2005 | Satoh |
| 7,054,236 B2 | 5/2006 | Kawano |
| 7,064,915 B1 | 6/2006 | Spaur et al. |
| 7,080,188 B2 | 7/2006 | Byers et al. |
| 7,099,963 B2 | 8/2006 | Byers et al. |
| 7,174,401 B2 | 2/2007 | Stuber et al. |
| 7,219,182 B2 | 5/2007 | Byers et al. |
| 2001/0043424 A1 | 11/2001 | Nguyen |
| 2001/0044873 A1 | 11/2001 | Wilson et al. |
| 2002/0080698 A1 | 6/2002 | Turner et al. |
| 2002/0087773 A1 | 7/2002 | Poisner et al. |
| 2002/0087931 A1 | 7/2002 | Jaber |
| 2002/0120815 A1 | 8/2002 | Zahavi et al. |
| 2002/0124132 A1 | 9/2002 | Haines et al. |
| 2002/0199076 A1 | 12/2002 | Fujii |
| 2003/0037225 A1 | 2/2003 | Deng et al. |
| 2003/0070030 A1 | 4/2003 | Smith et al. |
| 2003/0081479 A1 | 5/2003 | Matsumoto et al. |
| 2003/0084269 A1 | 5/2003 | Drysdale et al. |
| 2003/0117909 A1 | 6/2003 | Kawano |
| 2003/0204655 A1 | 10/2003 | Schmisseur et al. |
| 2004/0019831 A1 | 1/2004 | Gergen et al. |
| 2004/0093538 A1 | 5/2004 | Hester et al. |
| 2004/0199695 A1 | 10/2004 | Purdham et al. |
| 2006/0129704 A1 | 6/2006 | Byers et al. |
| 2007/0226392 A1 | 9/2007 | Byers et al. |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blahut R. Digital Transmission of Information (Dec. 4, 1990), pp. 429-430.

Hwang, Kai and Briggs, Faye A., "Computer Architecture and Parallel Processing" pp. 156-164 (Mar. 10, 2003).

Zeidman, Sob, "Interleaving DRAMS for faster access", System Design ASIC & EDA, pp. 24-34 (Nov. 1993).

P.M. Bland et al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

PCT Search Report for PCT/USO1/22404, mailed Jan. 29, 2003, 4 Pages.

PCT International Search Report, Doc. No. PCT/US2004/007119, Dated Aug. 2005.

"Embedded Risc Microcontrzller Core ARM7TDMI". Revision 0673CS-11/99/. Atmel Corporation.

PCI Local Bus Specification, Revision 2.1 Jun. 1, 1995, pp. 9-12, 21-23, 33-42, 108-109, 235-243.

Structure Computer Organization, 3rd Edition, By Andrew S. Tanenbaum, pp. 11-13, (Mar. 10, 2003).

"Memory and Peripheral Interface", Chapter 5-LH77790A/B User's Guide (Version 1.0), pp. 5-1 to 5-35, (Mar. 10, 2003).

* cited by examiner

METHOD AND SYSTEM FOR SUPPORTING MULTIPLE EXTERNAL SERIAL PORT DEVICES USING A SERIAL PORT CONTROLLER IN EMBEDDED DISK CONTROLLERS

CROSS-REFERENCE TO RELATED APPLICATIONS

This application is a continuation of U.S. patent application Ser. No. 10/385,039, filed on Mar. 10, 2003 (now U.S. Pat. No. 7,039,771). This application also relates to the subject matter of U.S. patent application Ser. No. 10/384,992, filed on Mar. 10, 2003 (now U.S. Pat. No. 7,492,545); U.S. patent application Ser. No. 10/385,022, filed on Mar. 10, 2003 (now U.S. Pat. No. 7,080,188); U.S. patent application Ser. No. 10/384,991, filed on Mar. 10, 2003 (now U.S. Pat. No. 7,457,903); U.S. patent application Ser. No. 10/385,042, filed on Mar. 10, 2003 (now U.S. Pat. No. 7,099,963); U.S. patent application Ser. No. 10/385,405, filed on Mar. 10, 2003 (now U.S. Pat. No. 7,064,915); and U.S. patent application Ser. No. 10/385,056, filed on Mar. 10, 2003 (now U.S. Pat. No. 7,219,182). The disclosures of the above applications are incorporated herein by reference.

FIELD

The present invention relates generally to storage systems, and more particularly to disk drive servo controllers.

BACKGROUND

The statements in this section merely provide background information related to the present disclosure and may not constitute prior art.

Conventional computer systems typically include several functional components. These components may include a central processing unit (CPU), main memory, input/output ("I/O") devices, and disk drives. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The main memory is typically smaller than disk drives and may be volatile. Programming data is often stored on the disk drive and read into main memory as needed. The disk drives are coupled to the host system via a disk controller that handles complex details of interfacing the disk drives to the host system. Communications between the host system and the disk controller is usually provided using one of a variety of standard I/O bus interfaces.

Typically, a disk drive includes one or more magnetic disks. Each disk (or platter) typically has a number of concentric rings or tracks (platter) on which data is stored. The tracks themselves may be divided into sectors, which are the smallest accessible data units. A positioning head above the appropriate track accesses a sector. An index pulse typically identifies the first sector of a track. The start of each sector is identified with a sector pulse. Typically, the disk drive waits until a desired sector rotates beneath the head before proceeding with a read or write operation. Data is accessed serially, one bit at a time and typically, each disk has its own read/write head.

Figure 1:
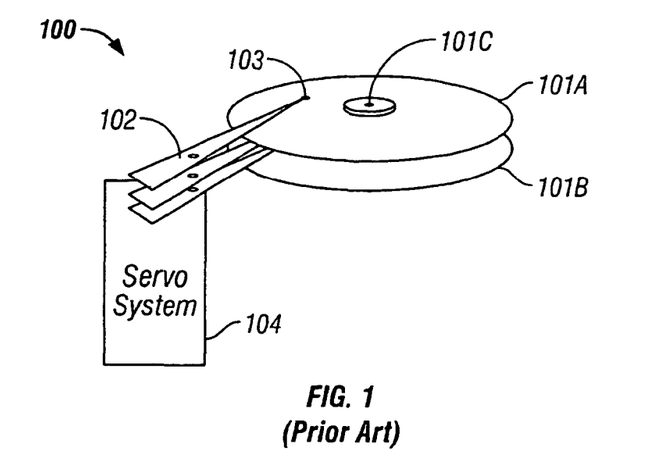
FIG. 1 shows a block diagram of a disk drive.

FIG. 1 shows a disk drive system 100 with platters 101A and 101B, an actuator 102 and read/write head 103. Typically, multiple platters/read and write heads are used. Platters 101A-101B have assigned tracks for storing system information, servo data and user data.

The disk drive is connected to the disk controller that performs numerous functions, for example, converting digital data to analog head signals, disk formatting, error checking and fixing, logical to physical address mapping and data buffering. To perform the various functions for transferring data, the disk controller includes numerous components.

To access data from a disk drive (or to write data), the host system must know where to read (or write data to) the data from the disk drive. A driver typically performs this task. Once the disk drive address is known, the address is translated to cylinder, head and sector based on platter geometry and sent to the disk controller. Logic on the hard disk looks at the number of cylinders requested. Servo controller firmware instructs motor control hardware to move read/write heads 103 to the appropriate track. When the head is in the correct position, it reads the data from the correct track.

Typically, read and write head 103 has a write core for writing data in a data region, and a read core for magnetically detecting the data written in the data region of a track and a servo pattern recorded on a servo region.

A servo system 104 detects the position of head 103 on platter 101A according to a phase of a servo pattern detected by the read core of head 103. Servo system 104 then moves head 103 to the target position.

Servo system 104 servo-controls head 103 while receiving feedback for a detected position obtained from a servo pattern so that any positional error between the detected position and the target position is negated.

Figure 3:
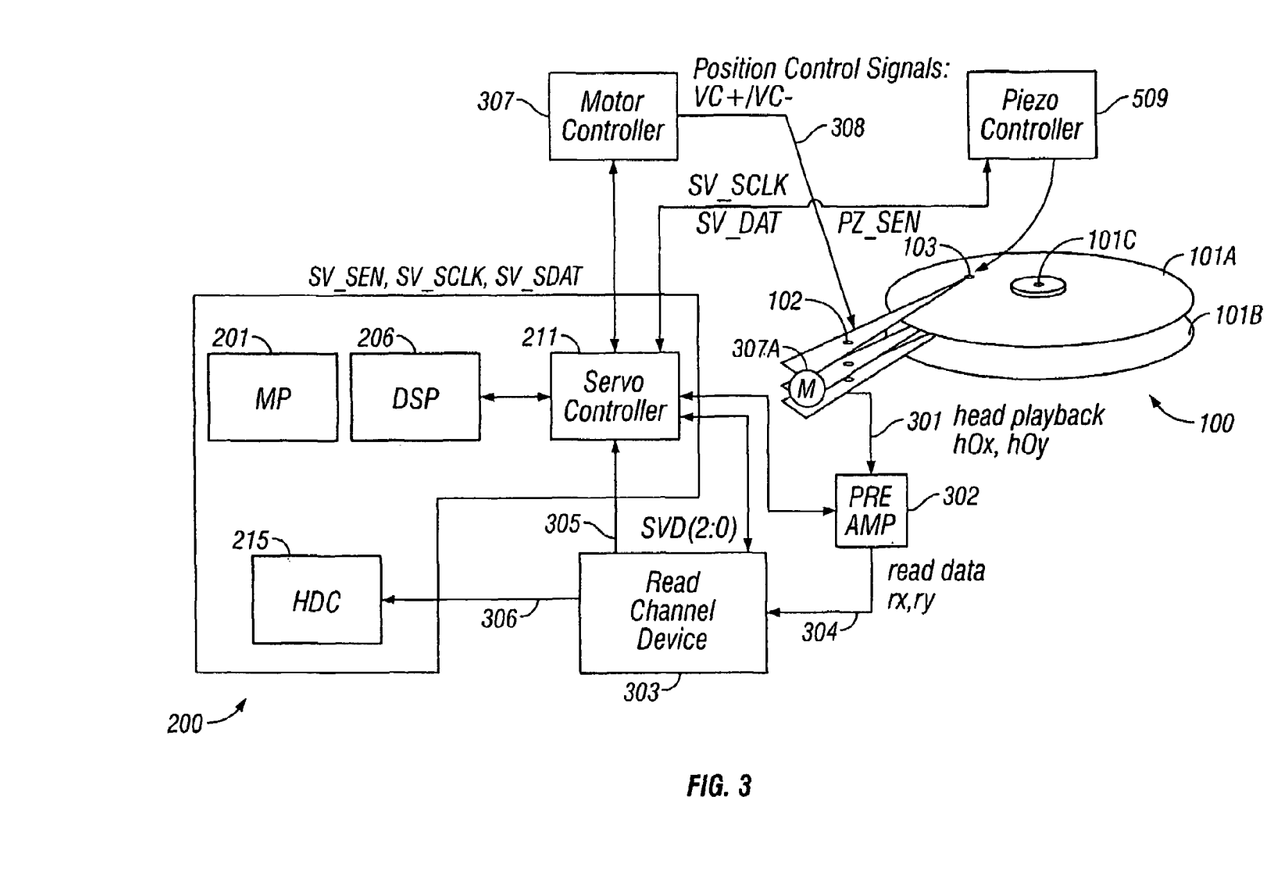
FIG. 3 is a block diagram showing the various components of the FIG. 3 system and a two-platter, four-head disk drive, according to one aspect of the present invention.

Typically, a servo controller in system 104 communicates with various serial port programmable devices coupled via a serial port interface. The serial port interface enables transmission of commands and configuration data. One such device is shown in FIG. 3, as the "read channel device 303". An example of such a product is "88C7500 Integrated Read channel" device sold by Marvell Semiconductor Inc®.

There is no standard for these various serial port devices to communicate with the servo controller. For example, length of address and length of data fields may vary from one device to the next. Hence, a single serial port connection is not typically used for plural devices having different protocols. Conventional techniques require a separate controller for each device. This is commercially undesirable because it adds costs and extra logic on a chip.

Therefore, what is desired is an efficient system that allows an embedded disk controller to communicate with plural devices through a single serial port controller interface.

SUMMARY

A servo controller for a disk drive controller comprises a storage device that stores communication information for a plurality of devices. A serial port controller located on the servo controller communicates with the storage device, receives a request to communicate with one of the plurality of devices, and allows communication between at least one processor and the one of the plurality of devices according to the stored communication information and the request, wherein each of the plurality of devices uses a different protocol.

In other features of the invention, the storage device includes at least one register. Logic that enables the plurality of devices to receive at least one of a write request and a read request. The serial port controller arbitrates between a plurality of the requests to communicate. The serial port controller communicates with at least one client device and receives the plurality of the requests to communicate from the at least one client device. The communication information includes at least one of address information, write data information, and read data information. The serial port controller outputs an enabling signal to the one of the plurality of devices according to the communication information and the request. A routing device communicates with the serial port controller, the storage device, and the plurality of devices and allows data to flow at least one of to and from the plurality of devices. At least one of the serial port controller and the storage device are located on one of an integrated circuit (IC) and a system on a chip (SOC) with the servo controller.

A method for communicating with serial port devices with a servo controller for a disk drive controller comprises storing communication information for a plurality of devices in a storage device, communicating with the storage device at serial port controller located on the servo controller, receiving a request to communicate with one of the plurality of devices at the serial port controller, and allowing communication between at least one processor and the one of the plurality of devices according to the stored communication information and the request, wherein each of the plurality of devices uses a different protocol.

In other features of the invention, the storage device includes at least one register. The method further comprises enabling the plurality of devices to receive at least one of a write request and a read request. The serial port controller arbitrates between a plurality of the requests to communicate. The serial port controller communicates with at least one client device and receives the plurality of the requests to communicate from the at least one client device. The communication information includes at least one of address information, write data information, and read data information. The serial port controller outputs an enabling signal to the one of the plurality of devices according to the communication information and the request. The method further comprises communicating with the serial port controller, the storage device, and the plurality of devices with a routing device, and allowing data to flow at least one of to and from the plurality of devices with the routing device.

A servo controller for a disk drive controller comprises storage means for storing communication information for a plurality of devices and serial port control means located on the servo controller for communicating with the storage means, for receiving a request to communicate with one of the plurality of devices, and for allowing communication between at least one processor and the one of the plurality of devices according to the stored communication information and the request, wherein each of the plurality of devices uses a different protocol.

In other features of the invention, the storage means includes at least one register. The servo controller further comprises logic means for enabling the plurality of devices to receive at least one of a write request and a read request. The serial port controller arbitrates between a plurality of the requests to communicate. The serial port control means communicates with at least one client device and receives the plurality of the requests to communicate from the at least one client device. The communication information includes at least one of address information, write data information, and read data information. The serial port control means outputs an enabling signal to the one of the plurality of devices according to the communication information and the request. The servo controller further comprises routing means for communicating with the serial port control means, the storage means, and the plurality of devices and for allowing data to flow at least one of to and from the plurality of devices. At least one of the serial port control means and the storage means are located on one of an integrated circuit (IC) and a system on a chip (SOC) with the servo controller.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures.

DRAWINGS

The drawings described herein are for illustration purposes only and are not intended to limit the scope of the present disclosure in any way.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

To facilitate an understanding of the preferred embodiment, the general architecture and operation of an embedded disk controller will be described initially. The specific architecture and operation of the preferred embodiment will then be described.

Figure 2:
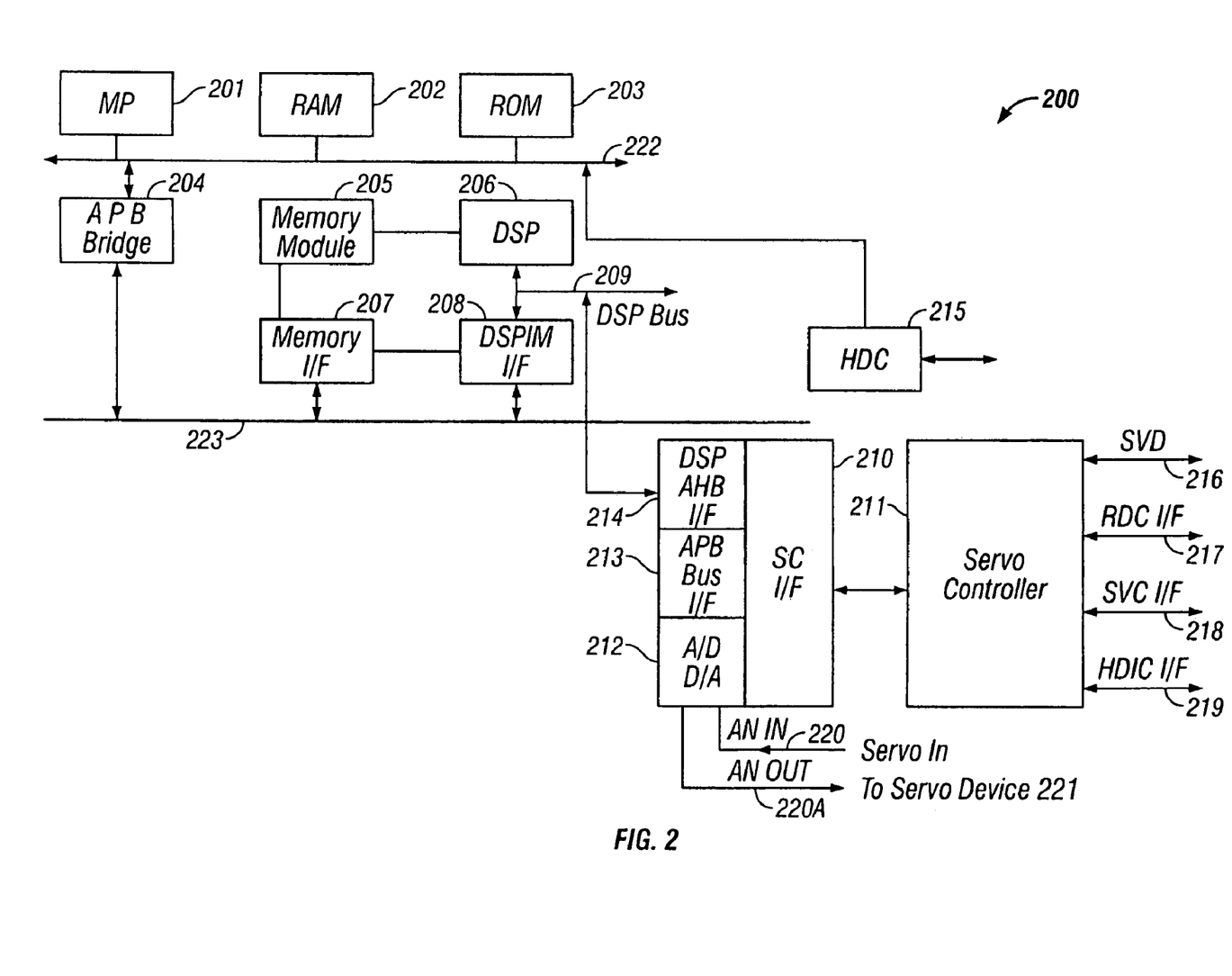
FIG. 2 is a block diagram of an embedded disk controller system, according to one aspect of the present invention.

FIG. 2 shows a block diagram of an embedded disk controller system 200 according to one aspect of the present invention. System 200 may be an application specific integrated circuit ("ASIC").

System 200 includes a microprocessor ("MP") 201 that performs various functions described below. MP 201 may be a Pentium® Class processor designed and developed by Intel Corporation® or an ARM processor. MP 201 is operationally coupled to various system 200 components via buses 222 and 223. Bus 222 may be an Advance High performance (AHB) bus as specified by ARM Inc. Bus 223 may an Advance Peripheral Bus ("APB") as specified by ARM Inc. The specifications for AHB and APB are incorporated herein by reference in their entirety.

System 200 is also provided with a random access memory (RAM) or static RAM (SRAM) 202 that stores programs and instructions, which allows MP 201 to execute computer instructions. MP 201 may execute code instructions (also referred to as "firmware") out of RAM 202.

System 200 is also provided with read only memory (ROM) 203 that stores invariant instructions, including basic input/output instructions.

System 200 is also provided with a digital signal processor ("DSP") 206 that controls and monitors various servo functions through DSP interface module ("DSPIM") 208 and servo controller interface 210 operationally coupled to a servo controller ("SC") 211.

DSPIM 208 interfaces DSP 206 with MP 201 and allows DSP 206 to update a tightly coupled memory module (TCM) 205 (also referred to as "memory module" 205) with servo related information. MP 201 can access TCM 205 via DSPIM 208.

Servo controller interface ("SCI") 210 includes an APB interface 213 that allows SCI 210 to interface with APB bus 223 and allows SC 211 to interface with MP 201 and DSP 206.

SCI 210 also includes DSPAHB interface 214 that allows access to DSPAHB bus 209. SCI 210 is provided with a digital to analog and analog to digital converter 212 that converts data from analog to digital domain and vice-versa. Analog data 220 enters module 212 and leaves as analog data 220A to a servo device 221.

SC 211 has a read channel device (RDC) serial port 217, a motor control ("SVC") serial port 218 for a "combo" motor controller device, a head integrated circuit (HDIC) serial port 219 and a servo data ("SVD") interface 216 for communicating with various devices.

FIG. 3 shows a block diagram with disk 100 coupled to system 200, according to one aspect of the present invention. FIG. 3 shows a read channel device 303 that receives signals from a pre-amplifier 302 (also known as head integrated circuit (HDIC)) coupled to disk 100. One example of a read channel device 303 is manufactured by Marvell Semiconductor Inc.®, Part Number 88C7500, while pre-amplifier 302 may be a Texas instrument, Part Number SR1790. Pre-amplifier 302 is also operationally coupled to SC 211. Servo data ("SVD") 305 is sent to SC 211.

A motor controller 307 (also referred to as device 307), (for example, a motor controller manufactured by Texas Instrument®, Part Number SH6764) sends control signals 308 to control actuator movement using motor 307A. It is noteworthy that spindle 101C is controlled by a spindle motor (not shown) for rotating platters 101A and 101B. SC 211 sends plural signals to motor controller 307 including clock, data and "enable" signals to motor controller 307 (for example, SV_SEN, SV_SCLK and SV_SDAT).

SC 211 is also operationally coupled to a piezo controller 509 that allows communication with a piezo device (not shown). One such piezo controller is sold by Rolm Electronics®, Part Number BD6801 FV. SC 211 sends clock, data and enable signals to controller 509 (for example, SV_SEN, SV_SCLK and SV_SDAT).

Figure 4:
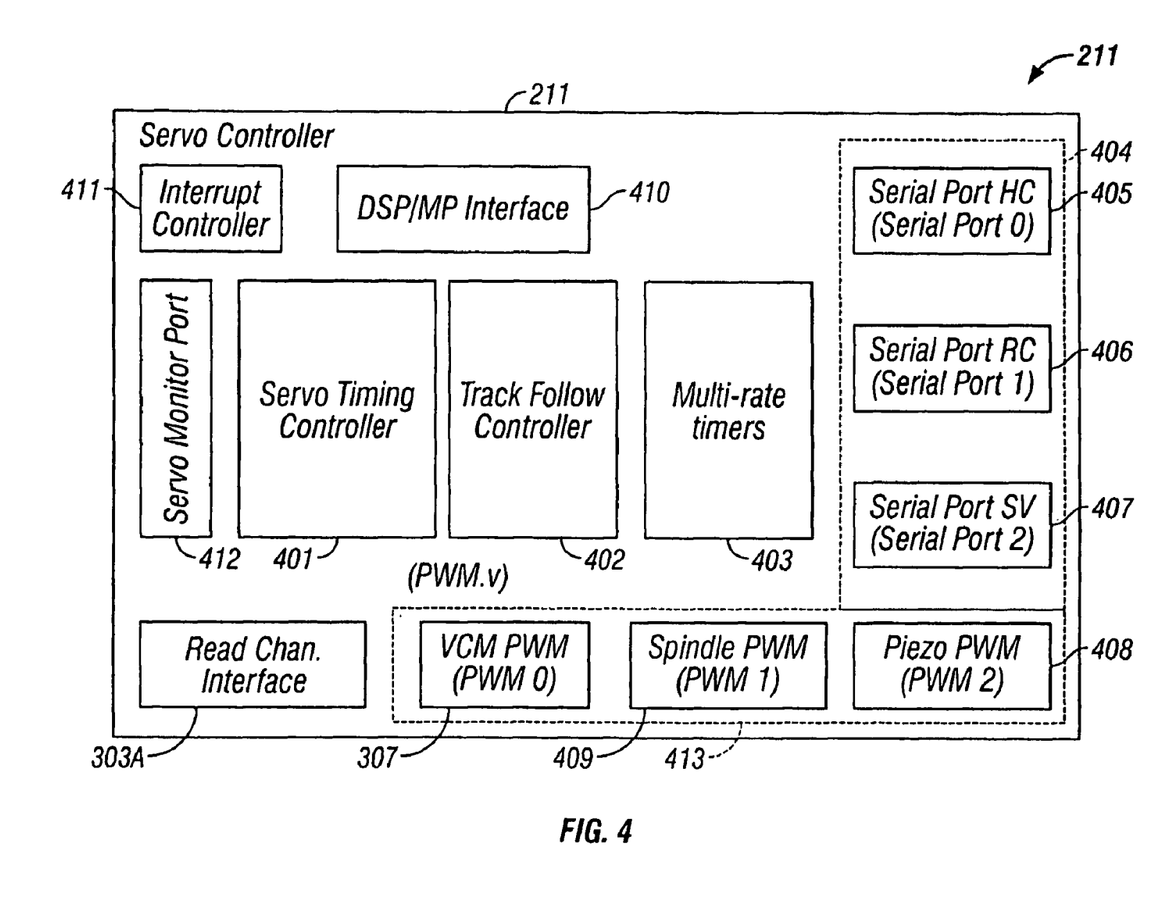
FIG. 4 is a block diagram of a servo controller, according to one aspect of the present invention.

FIG. 4 shows a block diagram of SC 211, according to one aspect of the present invention.

FIG. 4 shows SC 211 with a serial port controller 404 for controlling various serial ports 405-407.

SC 211 also has a servo-timing controller ("STC") 401 that automatically adjusts the time base when a head change occurs. Servo controller 211 includes an interrupt controller 411 that can generate an interrupt to DSP 206 and MP 201. Interrupts may be generated when a servo field is found (or not found) and for other reasons. SC 211 includes a servo monitoring port 412 that monitors various signals to SC 211.

SC 211 uses a pulse width modulation unit ("PWM") 413 for supporting control of motor 307A PWM, and a spindle motor PWM 409 and a piezo PWM 408.

MP 201 and/or DSP 206 use read channel device 303 for transferring configuration data and operational commands through SC 211 (via read channel serial port interface 406).

Figure 5:
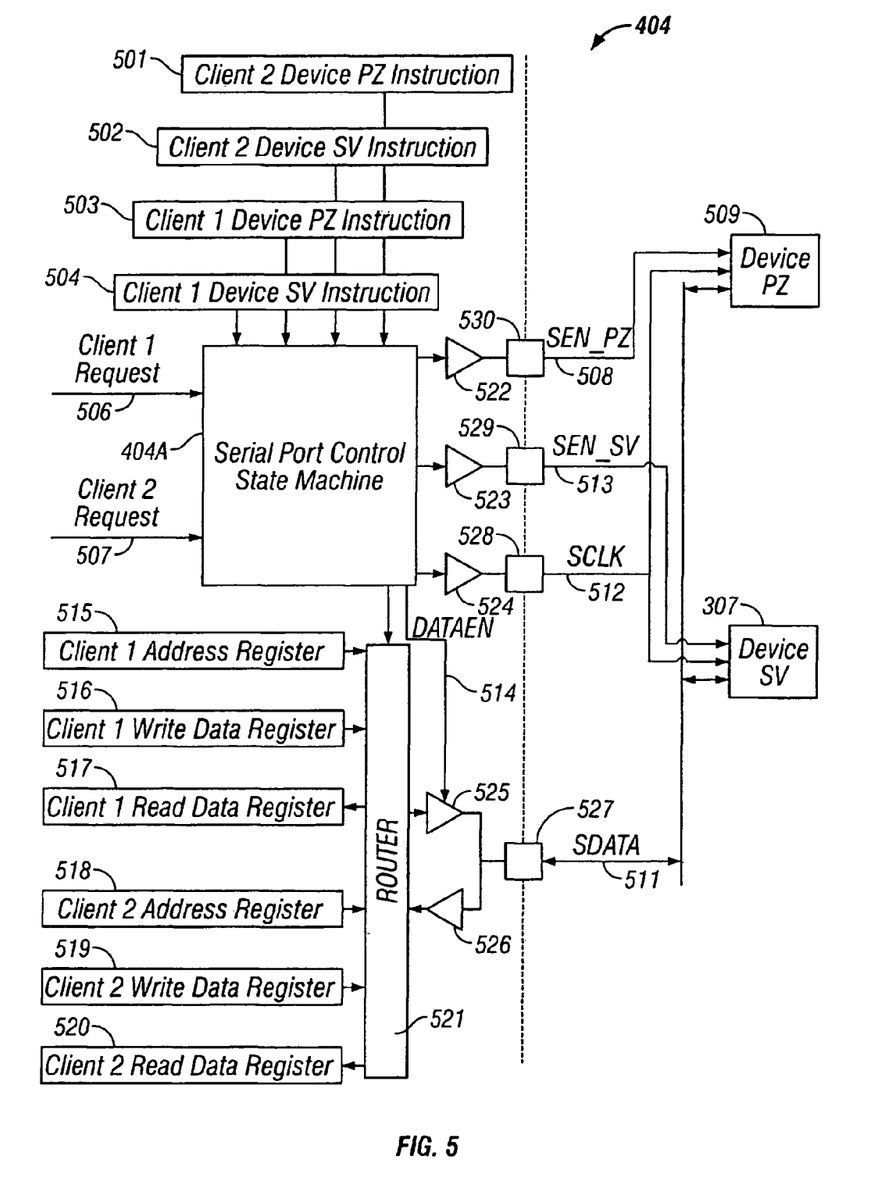
FIG. 5 is a schematic of a serial port controller, according to one aspect of the present invention.

FIG. 5 shows a block diagram of serial port controller 404, according to one aspect of the present invention. The example only shows how serial port controller 404 allows communication between system 200 and motor controller 307 and piezo controller 509. It is noteworthy that the invention is not limited to just these two or any particular number of devices.

Controller 404 includes a state machine 404A that has access to piezo controller 509 and device 307 information in registers 501 and 503 (that includes controller 509 and 307 protocol information), for MP 201 (referred to as Client 1 in FIG. 5 for illustration purposes only). State machine 404A can also access controller 509 and device 307 information in registers 502 and 504 for DSP 206 (referred to as Client 2 in FIG. 5 for illustration purposes only). Typically information in registers 501-504 includes address fields for each device (509 or 307 in this example), length of the data fields and timing control information (for example, if data from a certain device is captured on the rising or falling edge of a clock signal,) and setup and hold time data for the active edge of a clock signal.

Controller 404 also includes various registers, for example, registers 515-517 for storing address, write data and read data for controller requested by client 1, and registers 518-520 for storing address, write data and read data for a device requested by client 2. Information from register 515-520 is sent to a router 521 that allows MP 201 or DSP 206 to communicate with controller 509 or device 307.

Request to Write: The following example shows how MP 201 (or any other component) can write data to a device (in this example, controller 509 or device 307). MP 201 sends a request 506 that is received by state machine 404A. MP 201 then adds the address and data in register 515 and 516. Based on the information in registers 501-504, state machine 404A determines the identity of the device to which MP 201 wants to write. State machine 404A then sets up the device by generating signal 508 or 513 that enables controller 509 or device 307, respectively. Thereafter, data is written to controller 509 or device 307.

Figure 6A:
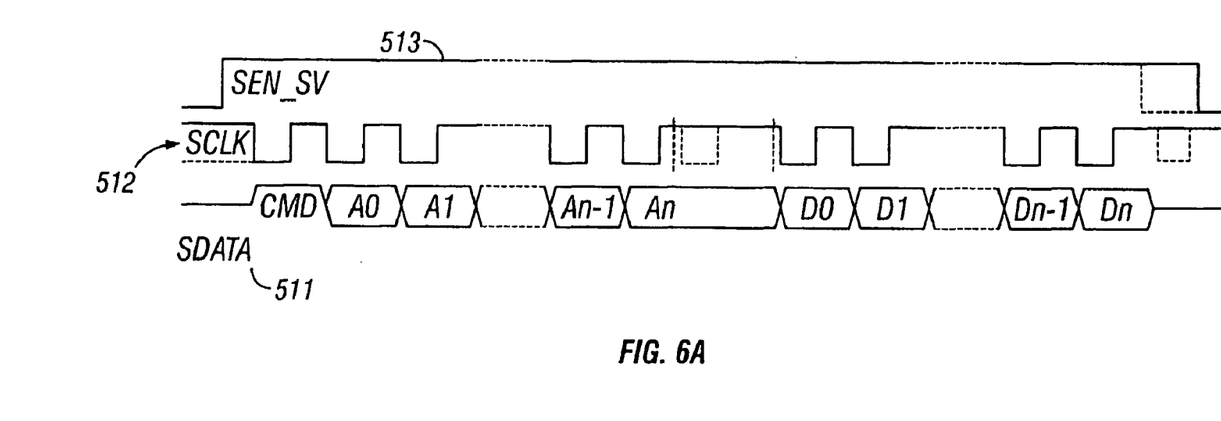
FIGS. 6A and 6B provides examples of timing diagrams as used by the serial port controller of FIG. 5 during a write and read phase, respectively, according to one aspect of the present invention.

FIG. 6A provides a timing diagram showing the relationship between signals 513, 512 and 511 to write data to device 307. Signal 512 is a serial clock that is used for synchronizing data transfer between a client and the device.

Request to Read: The following example shows how DSP 206 (or any other component) can read data from a device (in this example, controller 509 or device 307). A request 507 is received by state machine 404A from DSP 201. DSP 201 also provides an address to register 518. Based on the information in registers 501 and 502, state machine 404A determines the identity of the device to read data. State machine 404A then sets up signal 508 or 513 to read data from controller 509 or device 307.

Figure 6B:
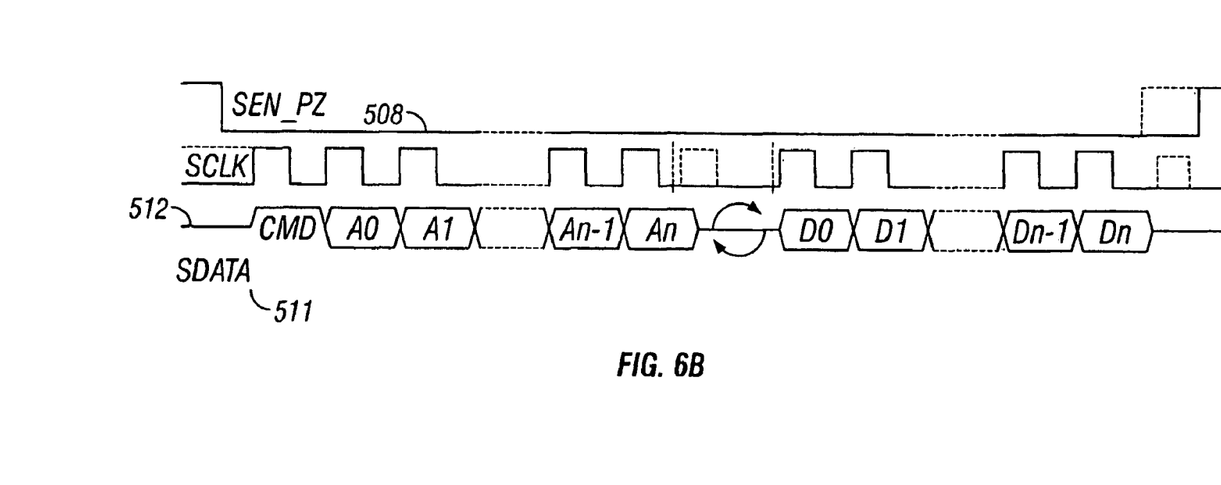

FIG. 6B provides a timing diagram showing the relationship between signals 508, 512 and 511 to read data from controller 509.

Figure 7:
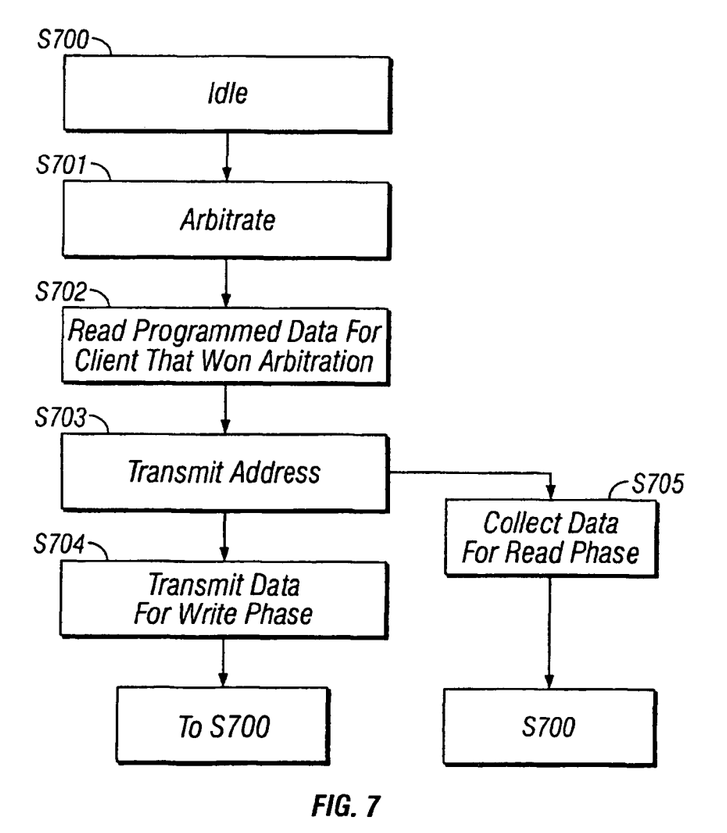
FIG. 7 is a flow diagram of executable steps for a state machine used by the serial port controller, according to one aspect of the present invention.

FIG. 7 is a flow diagram showing executable process steps used by state machine 404A, according to one aspect of the present invention.

In step S700, state machine 404A is in an idle state. When it receives requests from various clients (MP 201 and DSP 206), state machine 404A enters an arbitration mode in step S701. One of the clients wins arbitration and is then allowed to communicate to an external device, 509 or device 307.

In step S702, state machine 404A reads programmed information about a device (for example, controller 509 or device 307) from registers 501-504.

In step S703, state machine 404A transmits the appropriate device address to the client who won arbitration in step S701.

In step S704, state machine 404A, transmits data via router 521, to controller 509 or device 307, for a write mode. Thereafter, the process returns to step S700.

In step S705, state machine 404A, collects data via router 521, from controller 509 or device 307, for a read mode and the data is sent to register 520 for later recovery by the requesting client. Thereafter, the process returns to step S700.

In one aspect of the present invention, the servo controller with a single state machine can communicate with multiple serial port devices, and each device may have a different protocol.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A servo controller for a disk drive controller, comprising:
a storage device that stores communication information for a plurality of devices associated with servo control; and
a serial port controller located on the servo controller that communicates with the storage device, that receives a request to communicate with one of the plurality of devices via a respective one of a plurality of serial ports, and that allows communication between at least one processor and the one of the plurality of devices according to the stored communication information and the request, wherein each of the plurality of devices uses a different protocol.

2. The servo controller of claim 1 wherein the storage device includes at least one register.

3. The servo controller of claim 1 further comprising logic that enables the plurality of devices to receive at least one of a write request and a read request.

4. The servo controller of claim 1 wherein the serial port controller arbitrates between a plurality of the requests to communicate.

5. The servo controller of claim 4 wherein the serial port controller communicates with at least one client device and receives the plurality of the requests to communicate from the at least one client device.

6. The servo controller of claim 1 wherein the communication information includes at least one of address information, write data information, and read data information.

7. The servo controller of claim 1, wherein the serial port controller outputs an enabling signal to the one of the plurality of devices according to the communication information and the request.

8. The servo controller of claim 1, further comprising:
a routing device that communicates with the serial port controller, the storage device, and the plurality of devices and that allows data to flow at least one of to and from the plurality of devices.

9. The servo controller of claim 1 wherein at least one of the serial port controller and the storage device are located on one of an integrated circuit (IC) and a system on a chip (SOC) with the servo controller.

10. A method for communicating with serial port devices with a servo controller for a disk drive controller, comprising:
storing communication information for a plurality of devices associated with servo control in a storage device;
communicating with the storage device at a serial port controller located on the servo controller;
receiving a request to communicate with one of the plurality of devices via a respective one of a plurality of serial ports at the serial port controller; and
allowing communication between at least one processor and the one of the plurality of devices according to the stored communication information and the request, wherein each of the plurality of devices uses a different protocol.

11. The method of claim 10 wherein the storage device includes at least one register.

12. The method of claim 10 further comprising enabling the plurality of devices to receive at least one of a write request and a read request.

13. The method of claim 10 wherein the serial port controller arbitrates between a plurality of the requests to communicate.

14. The method of claim 13 wherein the serial port controller communicates with at least one client device and receives the plurality of the requests to communicate from the at least one client device.

15. The method of claim 10 wherein the communication information includes at least one of address information, write data information, and read data information.

16. The method of claim 10 wherein the serial port controller outputs an enabling signal to the one of the plurality of devices according to the communication information and the request.

17. The method of claim 10 further comprising:
communicating with the serial port controller, the storage device, and the plurality of devices with a routing device; and
allowing data to flow at least one of to and from the plurality of devices with the routing device.

18. A servo controller for a disk drive controller, comprising:
storage means for storing communication information for a plurality of devices associated with servo control; and
serial port control means located on the servo controller for communicating with the storage means, for receiving a request to communicate with one of the plurality of devices via a respective one of a plurality of serial ports, and for allowing communication between at least one processor and the one of the plurality of devices according to the stored communication information and the request, wherein each of the plurality of devices uses a different protocol.

19. The servo controller of claim 18 wherein the storage means includes at least one register.

20. The servo controller of claim 18 further comprising logic means for enabling the plurality of devices to receive at least one of a write request and a read request.

21. The servo controller of claim 18 wherein the serial port controller arbitrates between a plurality of the requests to communicate.

22. The servo controller of claim 21 wherein the serial port control means communicates with at least one client device and receives the plurality of the requests to communicate from the at least one client device.

23. The servo controller of claim 18 wherein the communication information includes at least one of address information, write data information, and read data information.

24. The servo controller of claim 18, wherein the serial port control means outputs an enabling signal to the one of the plurality of devices according to the communication information and the request.

25. The servo controller of claim 18, further comprising:
routing means for communicating with the serial port control means, the storage means, and the plurality of devices and for allowing data to flow at least one of to and from the plurality of devices.

26. The servo controller of claim 18 wherein at least one of the serial port control means and the storage means are located on one of an integrated circuit (IC) and a system on a chip (SOC) with the servo controller.

* * * * *